Feb. 22, 1927.                    W. W. DAVIS                    1,618,639

HERMETIC CLOSURE FOR RECEPTACLES

Filed March 29, 1922

Inventor
Webster W. Davis
By
Frank C. Curtis
Attorney

Patented Feb. 22, 1927.

1,618,639

UNITED STATES PATENT OFFICE.

WEBSTER W. DAVIS, OF CANAJOHARIE, NEW YORK.

HERMETIC CLOSURE FOR RECEPTACLES.

Application filed March 29, 1922. Serial No. 547,788.

Reference may be had to the accompanying drawings, and the reference characters marked thereon, which form a part of this specification. Similar characters refer to similar parts in the several figures therein.

This invention relates to the construction of closures for tumblers, jars and the like receptacles for containing food products, which are designed to be held sealed by atmospheric pressure.

The object of the invention is to provide a closure construction by means of which a tight and sure hermetic seal can be insured with a simple and small gasket arranged on an easily and cheaply formed seat on the exterior of the receptacle and a cap having a minimum amount of metal in its skirt which is shaped so as to press the small gasket closely to its seat with a maximum effect as a result of the exterior air pressure after air has been exhausted from the interior of the receptacle.

In attaining this object the gasket seat is formed by providing a shoulder on the exterior near the rim. Located on this shoulder about the rim is a small elastic gasket that is rectangular in cross section.

The cap has a flaring skirt so shaped that when first placed over the mouth of the receptacle its flaring wall rests lightly upon the upper and outer corner of the gasket in such manner as not to materially obstruct the withdrawal of air from the receptacle during the exhausting process, but when forced down for sealing, after the interior air has been exhausted, it will exert a pressure diagonally of the gasket or against opposite angles and force the gasket into its pocket-like seat, thus taking advantage of the greatest diameter of the gasket when expanding it into sealing position and thereby causing the gasket, although small, to spread over and lie closely against a considerable area of the receptacle.

In the accompanying drawings Fig. 1 shows a side elevation of a jar sealed with a closure embodying this invention.

The receptacle, 1, may be made in the shape of a jar, tumbler, can, or the like, of glass, porcelain or other desirable material with a shoulder, 2, around the exterior near the rim.

The gasket, 3, is made of rubber or other suitable elastic material in the form of a band of stock that is rectangular in cross section. This gasket is stretched over the rim of the receptacle and is seated on the gasket shoulder, and when first placed in position there may be a space, 4, between its under side and the upper face of the shoulder.

The cap, 5, which is preferably made of sheet metal but may be made of other thin sheet material having the requisite stiffness, has a downwardly and outwardly flaring skirt, 6, about its edge.

Figure 1:
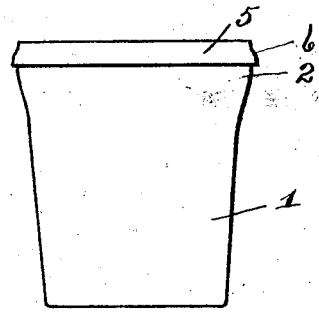
Figure 2:
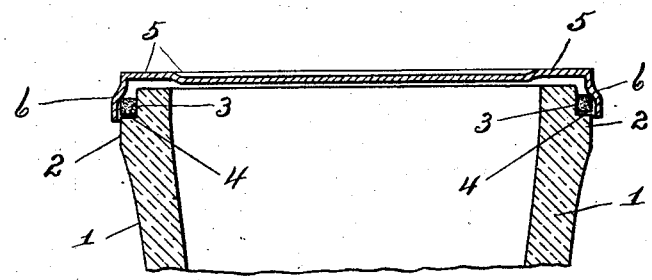
Fig. 2 shows on larger scale a diametrical section of the upper portion of the jar and the closure placed on top in the position occupied before air is exhausted and sealing is effected.
Figure 3:
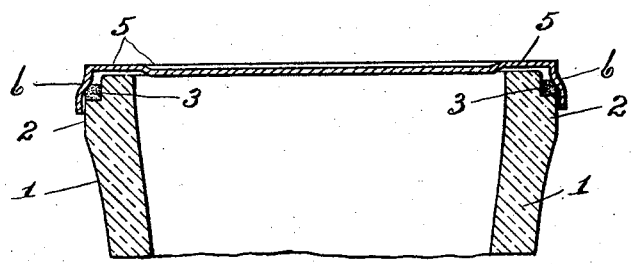
Fig. 3 is a similar view with the parts in the relation occupied after sealing.

This skirt is of such a size and is so shaped that when the cap is first placed over the top of the receptacle the inner wall of the flaring portion of the skirt rests lightly upon the thin and flexible upper outer corner of the gasket as shown in Fig. 2.

Closed in this manner and with the cap in this condition the receptacle is placed in the ordinary exhausting apparatus commonly employed for the purpose, and after the air has been exhausted from the interior the cap is pressed down in the well known way.

Thereafter the excess air pressure on the exterior holds the cap in place and keeps the receptacle tightly and securely sealed. When the cap is pressed down for sealing, the gasket is forced into its seat on the shoulder so as to fill any space which was left when the gasket was first placed about the rim of the receptacle.

This construction permits the use of a small, easily procured, and cheap gasket and enables a relatively shallow and cheaply formed cap to be used, for the skirt need extend downward only sufficientuly far to protect the gasket which is small and near the top of the receptacle. This of course, reduces to a minimum the quantity of gasket material, and the amount of metal necessary for producing the cap.

When the cap is pressed down for sealing the receptacle the gasket is forced diagonally or across its greatest diameter down into its seat without any tendency to slide outward off from the seat, and the greater the pressure on the cap the tighter the seal.

Figure 4:
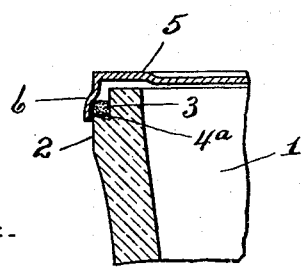
Fig. 4 is a view similar to Fig. 2, showing a broken-away portion of a jar of slightly modified form wth the gasket and cover applied thereto preparatory to the final sealing operation.

I have shown the shoulder, 2, formed at substantially right angles to the body of the jar, but for certain purposes of the invention the precise angle at which this shoulder is formed is immaterial and it may if desired be formed at an acute angle to the body of the jar as shown in Fig. 4, so that a triangular space, 4ª, will be formed between the gasket and the shoulder when the gasket is first applied to the jar.

Whether such space, 4, 4ª, be formed by reason of the acuteness of the angle of the shoulder to the jar, or by failure to fully press down the gasket to its seat when first applied to the jar, the gasket will nevertheless be fully forced down into its seat by the action of the skirt of the cap, due to external atmospheric pressure, and the sealing operation.

What I claim as new and desire to secure by Letters Patent is—

1. For hermetically sealing substances, the combination of a receptacle having an upwardly facing shoulder on its exterior below the rim, an elastic gasket of square cross section located on said shoulder, and a cap having a flaring skirt with the inner wall of the flaring portion of said skirt larger in diameter than the outer wall of said shoulder and inclined so as to engage the outer and upper corner of the gasket only when the cap is placed in position for sealing and compress the gasket diagonally when sealed.

2. For hermetically sealing substances, the combination of a receptacle having on its exterior below its rim, a shoulder with an upwardly facing horizontal gasket-seating surface; an elastic gasket engageable with said horizontal surface, and the outer wall of the body of the jar; and a cap having a flaring skirt with the inner wall of the flaring portion of said skirt larger in diameter than the outer wall of said shoulder, and inclined so as to engage the outer and upper edge portion only of the gasket when the cap is placed in position for sealing, and compress the gasket diagonally downward and inward.

3. For hermetically sealing substances, the combination of a receptacle having on its exterior below its rim a shoulder forming a substantially rectangular gasket-seat with an upwardly facing substantially horizontal surface; an elastic gasket having its inner lower corner in cross-section rectangular to fit said seat; and a cap having a flaring skirt with the inner wall of the flaring portion of said skirt larger in diameter than the outer wall of said shoulder and inclined so as to engage the outer and upper edge portion only of the gasket when the cap is placed in position for sealing and compress the gasket diagonally toward said seat when sealed.

4. For hermetically sealing substances, the combination of a receptacle having on its exterior below its rim a shoulder forming a substantially rectangular gasket-seat with an upwardly facing substantially horizontal surface; an elastic gasket substantially rectangular in cross-section engageable with said seat; and a cap having a flaring skirt with the inner wall of the flaring portion of the skirt larger in diameter than the outer wall of said shoulder and inclined so as to engage the outer and upper rectangular corner only of the gasket when the cap is placed in position for sealing and compress the gasket diagonally toward said seat when sealed.

5. For hermetically sealing substances, the combination of a receptacle having on its exterior below its rim a shoulder forming a substantially rectangular gasket-seat with an upwardly facing substantially horizontal surface; an elastic gasket substantially square in cross-section engageable with said seat, and a cap having a flaring skirt with the inner wall of the flaring portion of the skirt larger in diameter than the outer wall of said shoulder and inclined so as to engage the outer and upper rectangular corner only of the gasket when the cap is placed in position for sealing and compress the gasket diagonally toward said seat when sealed.

In testimony whereof, I have hereunto set my hand this 27th day of March, 1922.

WEBSTER W. DAVIS.